Dec. 5, 1967     R. J. SCOTT     3,356,916
FEED-THROUGH CAPACITOR
Filed April 27, 1966     2 Sheets-Sheet 1
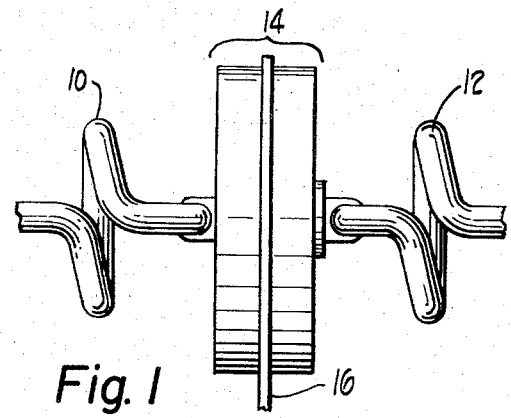
Fig. 1
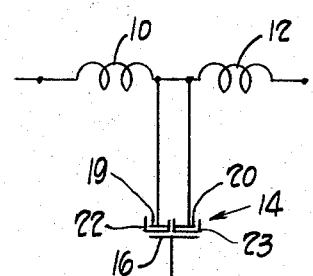
Fig. 2
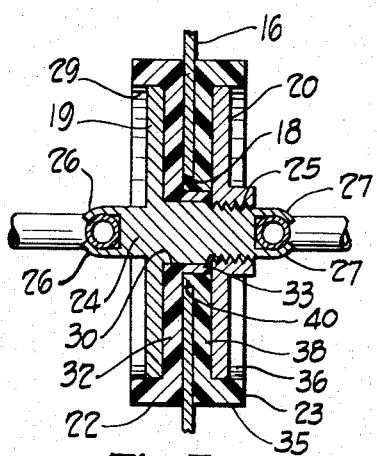
Fig. 3
Fig. 4
Fig. 5
Fig. 6
INVENTOR
ROBERT J. SCOTT
BY
ATTORNEYS.

United States Patent Office 3,356,916
Patented Dec. 5, 1967

3,356,916
FEED-THROUGH CAPACITOR
Robert James Scott, Parma, Ohio, assignor to Bird Electronic Corporation, Solon, Ohio, a corporation of Ohio
Filed Apr. 27, 1966, Ser. No. 545,596
9 Claims. (Cl. 317—242)

ABSTRACT OF THE DISCLOSURE

This invention relates to a low inductance, feed-through or bypass type capacitor having one electrode integrally formed with connecting means and having at least one cup-shaped dielectric member, preferably with the electrode positioned within the cup-shaped dielectric member. In certain embodiments, a second dielectric member cooperates with the cup-shaped dielectric member and completely encloses the electrode. In certain other embodiments, the electrode is exposed to the ambient and arcing and corona to the metal sheet defining the other electrode is prevented by a combination of solid and grease dielectric material filling the space between the electrodes.

This application is a continuation-in-part of my application, Ser. No. 261,723, filed Feb. 28, 1963, for High Power Filter, now Patent No. 3,267,396, issued Aug. 16, 1966.

At frequencies ranging upward from 50 mc. and high powers of the order of 500 watts or more, the problems of dielectric break-down, arcing and corona are greatly increased as compared to lower powers and low frequencies. Another problem in capacitors is that of reducing the space requirement, i.e., the volumetric displacement without diminishing the power handling capabilities and without introducing undesirable capacitive coupling between other circuit elements. Further, known capacitors generally require relatively long leads which present a combination of inductance and capacitance to ground instead of capacitance alone. Thus, these capacitors have a self-resonant frequency at or near which they stop being a capacitor and cause a dip or low level of attenuation in the stop band. For example, in one filter with a cut-off of the order of 400 mc., this problem occurred at frequencies of 800 mc. and above.

Accordingly, it is an object of this invention to provide an improved feed-through type capacitor.

A further object of this invention is to provide a low inductance feed-through type capacitor.

A still further object of this invention is to provide a feed-through type of capacitor capable of handling relatively high power and capable of good performance at relatively high frequencies.

It is another object of this invention to provide a feed-through type capacitor which includes as one electrode a metallic sheet member which may be an outer wall or a partition in an electrical unit having an aperture therein, a cylindrical, generally cup-shaped dielectric member, at least one electrode having a conductor secured thereto and extending through the dielectric member and the sheet and means for securing the electrode and the dielectric member against the sheet.

Yet another object of this invention is to provide a feed-through type capacitor which includes an apertured metallic sheet, such as a partition, as one of the electrodes and one or more flat electrodes supported on the sheet by a conductor passing through the sheet and having dielectric members which insulate the flat electrodes from the sheet at least one dielectric member extending into the aperture to center the conductor and the flat electrode relative to the aperture.

Another object of this invention is the provision of a feed-through capacitor suitable for mounting on a partition, comprising plate members each nested in an individual dielectric member which plate members are disposed on opposite sides of the partition in parallel relation thereto, the dielectric members interfitting and being centrally connected to locate and support the plate members relative to each other and relative to the partition.

Other objects and advantages relate to certain novel features of construction and combinations of parts apparent in the following detailed description of a preferred embodiment and modifications thereof representing the best known mode of practicing the invention. This description is made with reference to the accompanying drawings forming a part of the specification.

FIGURE 1 is a fragmentary view in elevation of a T type filter section employing a feed-through type capacitor according to a preferred embodiment of this invention;

FIGURE 2 is a schematic representation of the filter section of FIGURE 1;

FIGURE 3 is a sectional view of the capacitor of FIGURE 1;

FIGURE 4 is a sectional view of another illustrative embodiment of feed-through type capacitor according to this invention;

FIGURE 5 is a sectional view of still another illustrative embodiment of this invention;

FIGURE 6 is a sectional view of still another illustrative embodiment of this invention;

Figure 7:
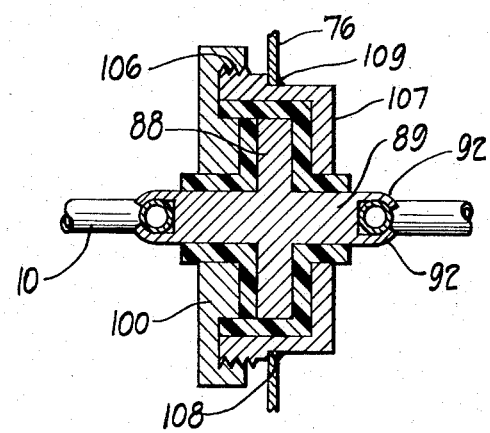
FIGURE 7 is a sectional view of an embodiment similar to FIGURE 6.

Referring now to the drawing, a T type filter section is shown in elevation in FIGURE 1 which section includes a pair of inductances 10, 12 mounted on and electrically connected to the opposite sides of a feed-through type capacitor 14. Capacitor 14 includes as one of its electrodes a metallic sheet member 16 which may be a wall or a partition in an electrical apparatus. Member 16 is connected to the ground terminal of the circuit in which it is employed or to the grounded chassis of an apparatus, not shown. The structural details of the capacitor 14 are shown in FIGURE 3. The partition 16 has a circular aperture 18 therein through which the capacitor 14 defines a metallic connection between coils 10 and 12. Capacitor 14 includes relatively flat, circular electrodes 19, 20 positioned in opposite sides of the sheet 16 and insulatingly supported relative thereto by a pair of dielectric cup-like members 22, 23. Electrode 19 is integrally formed with a conductor 24 which extends axially in both directions relative to the electrode 19 and has a threaded section 25 intermediate its ends to threadably receive a suitable fastener such as electrode 20. Conductor 24 has pairs of clamp-type terminals 26, 27 on the left-hand and right-hand ends, respectively, for mechanically engaging and electrically connecting the ends of the coils 10. 12 respectively.

Dielectric member 22 is preferably a generally circular member having a recess 29 on the outer face to receive the electrode 19 and an axially extending passage 30 which receives the conductor 24. Dielectric member 22 also has a flat end wall portion 32 and a cylindrical or annular projecting section 33 which extends through the aperture 18 in the partition 16. Dielectric member 23 has a cylindrical portion 35 with a circular recess 36 therein to receive the flat circular electrode 20. Member 23 includes a first circular portion 38, which abuts the surface of partition 16, and a cylindrical or annular projecting portion 40, which telescopingly engages the outer surface of the cylindrical section 33 of the dielectric member 22 and substantially fills the volume between the edge of the aperture 18 and the conductor 24. Thus, the cylindrical sections 33, 40 telescopingly engage each other and fill the volume between the electrodes 19, 20 and between the edge of the aperture 18 and the conductor 24. Dielectric grease is used in all embodiments where dielectric and metal members frictionally engage each other or abut each other. This grease completely fills all pockets thus reducing the possibility of arcing and corona by reducing voltage gradients. Also, a relatively tight junction is established to substantially eliminate or at least provide a very long labyrinth path for any arc discharge. The dielectric members also act to center the electrode 19, 20 relative to aperture 18.

The equivalent circuit of the filter of FIGURE 1 including the capacitor of FIGURE 3 is shown in FIGURE 2. This equivalent circuit illustrates that the filter section is a T filter section in which the capacitor electrodes 19, 20 define parallel connected electrodes which are connected intermediate coils 10, 12 and in which the partition 16 acts as a grounded electrode of the capacitor insulatingly spaced opposite electrodes 19, 20. In order to increase or decrease the effective capacitance of capacitor 14, the area of one or both electrodes is increased or decreased, respectively.

One arrangement for a smaller capacitor is shown in the embodiment of FIGURE 4 which employs a single ungrounded electrode insulatingly opposed to partition electrode 16. The embodiment of FIGURE 4 employs the electrode 19 of FIGURE 3 with integrally formed conductor 24 and the assembly is held on the partition 16 by means of a suitable nut 44 which threadably engages the threaded section 25 of the conductor 24 and engages a cup-shaped dielectric member 46. Preferably, the diameter of the nut is equal to or is slightly greater than the diameter of aperture 18 so that the face of nut 44 has little effect upon the capacity. Member 46 may be generally cylindrical in its main body portion 47 and preferably has a circular recess 48 to receive the nut 44. The dielectric member 46 is preferably thicker than member 22 to further minimize the capacity effects of the nut 44. Member 46 includes a cylindrical or annular projection 50 which telescopingly engages a reduced cylindrical sleeve-like section 52 of the dielectric member 22.

The telescoping relationship of the cylindrical sections 50, 52 presents a labyrinth path through which current must flow in order to break down or arc between conductor 24 and the edge of the aperture 18 in the partition 16. Further, these telescoping sections are preferably lubricated with a dielectric grease prior to assembly to eliminate any air in the region between the inner conductor 24 and the edge of the aperture 18 to thus eliminate any possibility of corona discharge within the space between electrode 19, partition 16 and conductor 24.

The embodiment shown in FIGURE 5 is another single electrode feed-through type capacitor 58 in which electrode 60 is integrally formed with an axially extending conductor 62, which conductor extends through aperture 18 in the partition 16. In this particular embodiment, a flat circular dielectric member 64 separates the electrode 60 from the metallic partition 16 and a cup-shaped dielectric member 66 separates nut 44 from the partition 16. Also, dielectric member 66 has a projecting cylindrical portion 68 which extends through the aperture 18 and engages the flat inner surface of dielectric member 64. Thus cylindrical section 68 fills the space between the conductor 62 and the edge of the aperture 18 to prevent arcing between the conductor 62 and the partition 16. Also, this projecting cylindrical section 68 acts to align the conductor 62 and the plate 60 relative to the aperture 18 to thus assure an equal break-down or arcing distance from the conductor 62 in all directions toward the partition 16. Again, the feedthrough type capacitor is connected to the coils 10, 12 by suitable mechanical means such as pairs of bent metal ears or opposed tabs 70, 72.

It is also possible to employ as a feed-through type capacitor, a single electrode mounted entirely on one side of a partition as illustrated in FIGURE 6 which is a view in section of such an embodiment. In this embodiment a capacitor 75 is mounted on a partition 76 by employing a cup-shaped metallic housing 77 brazed in an aperture 78 in partition 76, as indicated at 79. The cup-like member 77 has a dielectric lining in the form of a cup-shaped member 82 which preferably includes an integral cylindrical portion 84 projecting through an aperture 85 in the cup member 77 a distance greater than the thickness of the side wall 86 of the cup-shaped member 77. Capacitor 75 includes a generally circular electrode 88 and an integrally formed conductor 89 which extends axially in both directions from electrode 88. The conductor 89 terminates in pairs of oppositely facing metal ears 90, 92 which can be bent over the respective coils 10, 12.

Capacitor 75 also includes a second dielectric member 95 having a generally flat circular portion 96 the outer edge of which snugly engages the interior wall of the dielectric member 82. Member 95 includes an annular cylindrical section 98 which extends along the conductor 89 beyond an outer metallic cap 100. The cap 100 has an aperture 102 therein through which the conductor passes and a threaded portion 104 which threadably engages a threaded section 106 on the edge of the cup-shaped member 77. When the dielectric members 82, 95 are lubricated with dielectric grease or fluid and cap 100 is screwed tightly onto the cup member 77, voids within the capacitor housing are eliminated and corona and internal arcing are substantially eliminated even at relatively high voltages. The resulting capacity is obtained principally from the opposed parallel surfaces. However, additional capacity is also obtained between the edge of plate or electrode 88 and the inside wall of circular body 77.

The embodiment of FIGURE 6 is shown with one end wall of the cup 77 mounted in the plane containing the partition 76. However, it is not essential that this co-planar relationship exist. For example, an alternative embodiment is shown in FIGURE 7 in which the partition 76 receives a suitable cup-shaped metallic member 107 until the edge of the partition 76 engages a suitable circular shoulder 108 on the cup member 107. The cup 107 may be soldered or brazed to the partition 77 as indicated at 109. The cap member 100 threadably engages the threaded portion 106 and the cap member 100 acts as a ground plane for the electrode 88.

One of the important features of this invention is a capacitor exhibiting relatively low inductance. Connecting leads which run parallel to the grounded chassis or to other adjacent conductors, act as inductances. A capacitor with a relatively long terminal presents a combination of inductance and capacitance to ground instead of purely capacitance. Thus a capacitor with a relatively long terminal has a self-resonant frequency at or near the frequency of which they stop being a capacitor and cause a dip or low level of attenuation in the stop band. In a filter with a cut-off of 400 mc. employing a prior art type of capacitor, this problem occurred at approximately 800 mc. and above. The attenuation level dropped above 800 mc. to a level in the range of 20–40 db and remained at that level for high frequencies. When a capacitor of the type shown in FIGURES 1 and 3 was employed in the same filter, the modified filter provided a stop band with a minimum high level attenuation in the range of 60–80 db to a frequency of at least 1000 mc. These comparative results are attributable at least in part to the low inductance of the novel capacitors disclosed in this application. One of the principal ways in which these capacitors exhibit a relatively low inductance is by employing structures which provide for the shortest possible terminals.

Figure 8:
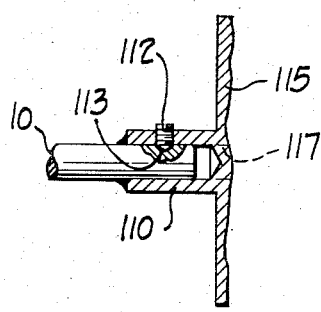
FIGURES 8–10 are fragmentary sectional views of capacitor connecting arrangements for minimizing the inductance of the capacitor terminals.
Figure 9:
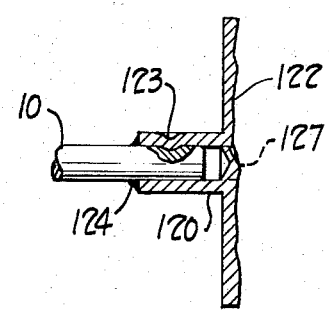
Figure 10:
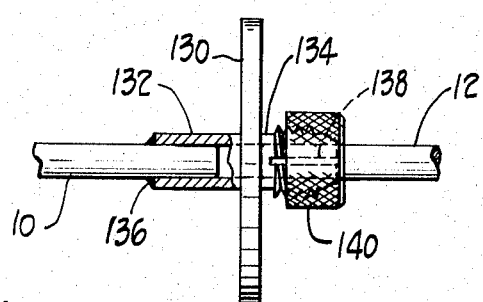

Embodiments of capacitors employing these low inductance terminals are shown in fragmentary views in FIGURES 8, 9 and 10 in which the partition and dielectric members are omitted. In FIGURE 8, the end of inductance 10 slides axially into a circular sleeve 110 where it may be secured by suitable mechanical means, such as by a set screw 112 threadably engaging the sleeve 110 and having a pointed end 113 which penetrates into the conductor 10. The electrode 115 is only shown in fragmentary view, it being understood that the electrode may correspond to any one of the types shown in FIGURES 1 and 3–6. Also, the electrode may have an axial passage extending therethrough as indicated by the dotted outline 117 so that the conductor or inductor 10 may pass completely through the capacitor electrode 115 and through the partition such as the partition 16 to which it is attached.

In the embodiment of FIGURE 9, the end of the inductor 10 is slid axially into a suitable metal sleeve 120, integrally formed with the capacitor electrode 122 and may be secured in this position by mechanically crimping the cylindrical sleeve 120 as indicated at 123. Suitable solder such as the solder 124 may be provided to assure good electrical contact between the inductor 10 and the sleeve 120 and to smooth any rough edges that might appear at the junction of the sleeve 120 and the inductor 10. Also, this embodiment may be provided with an axially extending passage, such as the passage 127 indicated in dotted outline, so that the inductor 10 may pass completely through the electrode 122.

A combination of low inductance connections are shown in the embodiment of FIGURE 10. An electrode 130 has a pair of oppositely directed sleeve members 132, 134 each of which receives a conductor such as the inductors 10, 12 of FIGURE 1. In the instance of sleeve 132, the inductor 10 is forced axially into the sleeve and is connected to the sleeve 132 by suitable means such as by brazing or soldering at 136. In the instance of sleeve 134, the sleeve is provided with a plurality of longitudinal slits or notches such as the notch 138 so that the separate portions may be compressively held against the conductor 12 by a threaded nut such as the nut 140. In each of these instances, the length of the sleeve extending from the electrode is relatively short and is only provided with sufficient length to make good electrical and mechanical connection to the oppositely disposed conductors. Thus the capacitor terminals exhibit a minimum of inductance and thereby diminish the tendency of the capacitor to be self-resonating. At frequencies below 50 mc., the inductive effect of the capacitor terminals will hardly be discernible, however, the increasing frequencies above 50 mc., the effect of lead inductance of the prior art devices becomes appreciable and can result in a decrease of the attenuation of a given filter from a range of 60–80 db to an attenuation in the range of 20–40 db.

It will be appreciated that the invention may be embodied in forms other than those specifically disclosed herein, which are given by way of example only. For example, the electrodes and dielectric members have been described as preferably being circular. However, they may be polygonal and often are square. Also, dielectric member 46 which receives nut 44 may be square. The essential combination, features and characteristics of the invention are set forth in the appended claims.

What is claimed is:

1. A feed-through type capacitor comprising:
a metallic sheet member having an aperture therein;
a relatively flat electrode having conductors extending from opposite sides thereof;
dielectric means including a dielectric member having a body portion with a recess therein, an end wall and a hollow portion extending substantially perpendicularly from said end wall, said hollow portion extending through said aperture and receiving one of said conductors for locating said electrode relative to said sheet member, said dielectric means including a layer of dielectric material between said electrode and said sheet member; and
means for mounting said electrode on said sheet member with said conductors on opposite sides of said sheet member.

2. The combination according to claim 1 wherein said mounting means includes a cylindrical member encircling said electrode and said dielectric means and means for securing said cylindrical member to said sheet member.

3. The combination according to claim 1 wherein said mounting means includes a cup-shaped member having an end wall and a circular side wall encircling said electrode and said dielectric means, said dielectric means including a second dielectric member engaging said electrode and having a passage therethrough and an apertured metallic cap member, one of said conductors extending through said passage in said second dielectric member and through the aperture in said cap member.

4. A feed-through type capacitor comprising:
a metallic sheet means having an aperture therein and defining at least a portion of one electrode of said capacitor,
two members formed of dielectric material, one of said members being cup-shaped to receive at least a portion of one electrode therein,
at least one of said dielectric members having a cylindrical portion projecting into said aperture for locating said members relative to each other and to said sheet means,
a metallic electrode member within said cup-shaped member and bearing against one side of said one dielectric member and means including a conductor connected to said electrode member and extending through said sheet means and through said cylindrical portion of said one dielectric member, means for urging said electrode member toward said metallic sheet;
means on each side of said sheet for making electrical connections to said metallic plate member, and
means for urging the other of said dielectric members toward said electrode member.

5. A capacitor according to claim 4 including:
a metallic cup-shaped member having cylindrical side walls and a circular end wall, said end wall having an aperture therein, said cup-shaped member being secured in said metallic sheet means with its end wall lying substantially in the plane of the metallic sheet means;
said cup-shaped dielectric member being positioned within said cup-shaped metallic member and including an annular cylindrical portion projecting through said side wall;
said electrode having a generally circular configuration positioned within said cup-shaped dielectric member and including a conductor extending axially in opposite directions relative to said electrode;
a second dielectric member including a flat circular portion positioned within and having its periphery engaging said first dielectric member and including a projecting cylindrical portion encircling said conductor; and
an apertured cap-shaped metallic member engaging said cup-shaped metallic member and said second dielectric member, said projecting cylindrical portion extending through said apertured cap.

6. A feed-through type capacitor according to claim 4 wherein:
said plate member has a generally circular configuration and wherein said conductor extends axially in opposite directions from said plate member, said conductor extending through said aperture,
wherein one of said dielectric members is a flat circular member positioned between said electrode and said metallic sheet and having a conductor passage therethrough, said conductor extending through said passage,
and wherein the other dielectric member has a generally cup-shaped configuration including a cylindrical portion and an axially extending cylindrical projection which extends through said aperture and engages said one dielectric member.

7. A feed-through capacitor according to claim 4 wherein both of said dielectric members are cup-shaped each having a recess therein facing away from said metallic sheet, said metallic plate member being positioned within one of said recesses.

8. A feed-through capacitor according to claim 7 including a second metallic plate member positioned in the other of said recesses and wherein said means for urging said plate member toward said metallic sheet includes said second metallic plate member.

9. A feed-through capacitor according to claim 4 wherein one of said dielectric members has a recess therein facing away from said metallic sheet and has a smaller outer diameter than the other dielectric member and wherein said means for urging said plate member toward said metallic sheet includes a fastener engaging said conductor and resting in said recess.

References Cited
UNITED STATES PATENTS 2,668,946    2/1954    Benett _____ 317—261 X

FOREIGN PATENTS 741,019    11/1955    Great Britain.

LEWIS H. MYERS, *Primary Examiner.*

E. GOLDBERG, *Assistant Examiner.*